US012757140B2

(12) United States Patent
Prakash et al.

(10) Patent No.: US 12,757,140 B2
(45) Date of Patent: Oct. 6, 2026

(54) SYSTEM INFORMATION BLOCK DELIVERY IN SIDELINK

(71) Applicant: QUALCOMM Incorporated, San Diego, CA (US)

(72) Inventors: Rajat Prakash, San Diego, CA (US); Sherif Elazzouni, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 973 days.

(21) Appl. No.: 17/646,652

(22) Filed: Dec. 30, 2021

(65) Prior Publication Data

US 2023/0217391 A1 Jul. 6, 2023

(51) Int. Cl.

*H04W 56/00* (2009.01)
*G01S 19/25* (2010.01)
*H04J 3/06* (2006.01)
*H04W 92/18* (2009.01)

(52) U.S. Cl.

CPC ......... *H04W 56/004* (2013.01); *G01S 19/256* (2013.01); *H04J 3/0644* (2013.01); *H04W 56/001* (2013.01); *H04W 92/18* (2013.01)

(58) Field of Classification Search

None
See application file for complete search history.

(56) References Cited

U.S. PATENT DOCUMENTS

2011/0038294 A1* 2/2011 Zhou ...................... H04B 7/155 370/311
2012/0294163 A1* 11/2012 Turtinen ........... H04W 56/0045 370/252
2015/0264588 A1* 9/2015 Li ....................... H04W 56/002 370/350
2016/0095074 A1* 3/2016 Park .................... H04W 56/001 370/350
2017/0048822 A1* 2/2017 Lee ....................... H04W 72/02
2017/0237463 A1* 8/2017 Zheng ................... H04W 16/14 370/328
2017/0332372 A1* 11/2017 Lee ..................... H04W 72/542
2018/0092027 A1* 3/2018 Sheng ................... H04W 48/08
2018/0152323 A1* 5/2018 Nakamura .............. H04L 12/66
2018/0324842 A1* 11/2018 Gulati ............... H04W 72/1263

(Continued)

FOREIGN PATENT DOCUMENTS

WO WO-2018204131 A1 11/2018
WO WO-2021142386 A1 7/2021

OTHER PUBLICATIONS

Coolpad et al., "Discussion on Relay Unicast the SIB to Remote UE Over Sidelink", 3GPP Tsg Ran WG2 Meeting #98, R2-1704719, 3rd Generation Partnership Project, Mobile Competence Centre, 650, Route Des Lucioles, F-06921 Sophia-Antipolis Cedex, vol. RAN WG2, No. Hangzhou, China, May 15, 2017-May 19, 2017, May 14, 2017, XP051275257, pp. 1-2.

International Search Report and Written Opinion—PCT/US2022/080884—ISA/EPO—Mar. 17, 2023.

*Primary Examiner* — Nicholas Sloms
(74) *Attorney, Agent, or Firm* — Harrity & Harrity, LLP

(57) ABSTRACT

Various aspects of the present disclosure generally relate to wireless communication. In some aspects, a first user equipment (UE) may transmit, to a second UE, a system information block (SIB) that includes first timing information. The UE may transmit, to the second UE, second timing information associated with an update to the first timing information. Numerous other aspects are described.

30 Claims, 11 Drawing Sheets

(56) References Cited

U.S. PATENT DOCUMENTS

| | | | | |
|---|---|---|---|---|
| 2019/0116571 | A1* | 4/2019 | Yang | G01S 19/256 |
| 2019/0289561 | A1 | 9/2019 | Corley et al. | |
| 2020/0229093 | A1* | 7/2020 | Ahmad | H04W 52/0209 |
| 2021/0022097 | A1* | 1/2021 | Park | H04W 8/005 |
| 2021/0050954 | A1* | 2/2021 | Ryu | H04W 76/14 |
| 2021/0168774 | A1* | 6/2021 | Li | H04W 16/14 |
| 2021/0168852 | A1* | 6/2021 | Panteleev | H04L 5/0055 |
| 2021/0306824 | A1* | 9/2021 | Li | H04W 4/40 |
| 2021/0337491 | A1 | 10/2021 | Xu et al. | |
| 2022/0116967 | A1* | 4/2022 | Yeo | H04W 72/1268 |
| 2022/0140967 | A1* | 5/2022 | Khoryaev | H04W 56/002 375/220 |
| 2022/0141756 | A1* | 5/2022 | Pan | H04W 48/12 370/328 |
| 2022/0272650 | A1* | 8/2022 | Ko | H04W 56/0045 |
| 2022/0303175 | A1* | 9/2022 | Kunz | H04W 4/08 |
| 2022/0312535 | A1* | 9/2022 | Wu | H04W 8/005 |
| 2023/0300725 | A1* | 9/2023 | Basu Mallick | H04W 48/14 370/329 |
| 2023/0308991 | A1* | 9/2023 | Zhang | H04W 48/14 |
| 2023/0309086 | A1* | 9/2023 | Ko | H04W 76/14 |
| 2023/0327746 | A1* | 10/2023 | Wai | H04B 7/08 |
| 2023/0397247 | A1* | 12/2023 | Jung | H04L 1/1854 |
| 2023/0413204 | A1* | 12/2023 | Babaei | H04W 56/0045 |
| 2024/0008058 | A1* | 1/2024 | Chang | H04W 48/14 |
| 2024/0147395 | A1* | 5/2024 | Singh | H04W 56/0065 |

* cited by examiner

SYSTEM INFORMATION BLOCK DELIVERY IN SIDELINK

FIELD OF THE DISCLOSURE

Aspects of the present disclosure generally relate to wireless communication and to techniques and apparatuses for system information block delivery in sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting, to a second UE, a system information block (SIB) that includes first timing information. The method may include transmitting, to the second UE, second timing information associated with an update to the first timing information.

Some aspects described herein relate to a method of wireless communication performed by a first UE. The method may include receiving, from a second UE, a request for a SIB that is associated with a base station. The method may include transmitting, to the second UE, the SIB, wherein the SIB includes timing information that is based at least in part on a first time value, associated with first UE, that corresponds to a second time value, associated with the base station.

Some aspects described herein relate to an apparatus for wireless communication performed by a first UE. The apparatus may include a memory and one or more processors, coupled to the memory. The one or more processors may be configured to transmit, to a second UE, a SIB that includes first timing information. The one or more processors may be configured to transmit, to the second UE, second timing information associated with an update to the first timing information.

Some aspects described herein relate to an apparatus for wireless communication performed by a first UE. The apparatus may include a memory and one or more processors, coupled to the memory. The one or more processors may be configured to receive, from a second UE, a request for a SIB that is associated with a base station. The one or more processors may be configured to transmit, to the second UE, the SIB, wherein the SIB includes timing information that is based at least in part on a first time value, associated with first UE, that corresponds to a second time value, associated with the base station.

Some aspects described herein relate to a non-transitory computer-readable medium that stores a set of instructions for wireless communication by a first UE. The set of instructions, when executed by one or more processors of the UE, may cause the UE to transmit, to a second UE, a SIB that includes first timing information. The set of instructions, when executed by one or more processors of the UE, may cause the UE to transmit, to the second UE, second timing information associated with an update to the first timing information.

Some aspects described herein relate to a non-transitory computer-readable medium that stores a set of instructions for wireless communication by an UE. The set of instructions, when executed by one or more processors of the UE, may cause the UE to receive, from a second UE, a request for a SIB that is associated with a base station. The set of instructions, when executed by one or more processors of the UE, may cause the UE to transmit, to the second UE, the SIB, wherein the SIB includes timing information that is based at least in part on a first time value, associated with the first UE, that corresponds to a second time value, associated with the base station.

Some aspects described herein relate to an apparatus for wireless communication. The apparatus may include means for transmitting a SIB that includes first timing information. The apparatus may include means for transmitting second timing information associated with an update to the first timing information.

Some aspects described herein relate to an apparatus for wireless communication. The apparatus may include means for receiving a request for a SIB that is associated with a base station. The apparatus may include means for transmitting the SIB, wherein the SIB includes timing information that is based at least in part on a first time value, associated with the apparatus, that corresponds to a second time value, associated with the base station.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
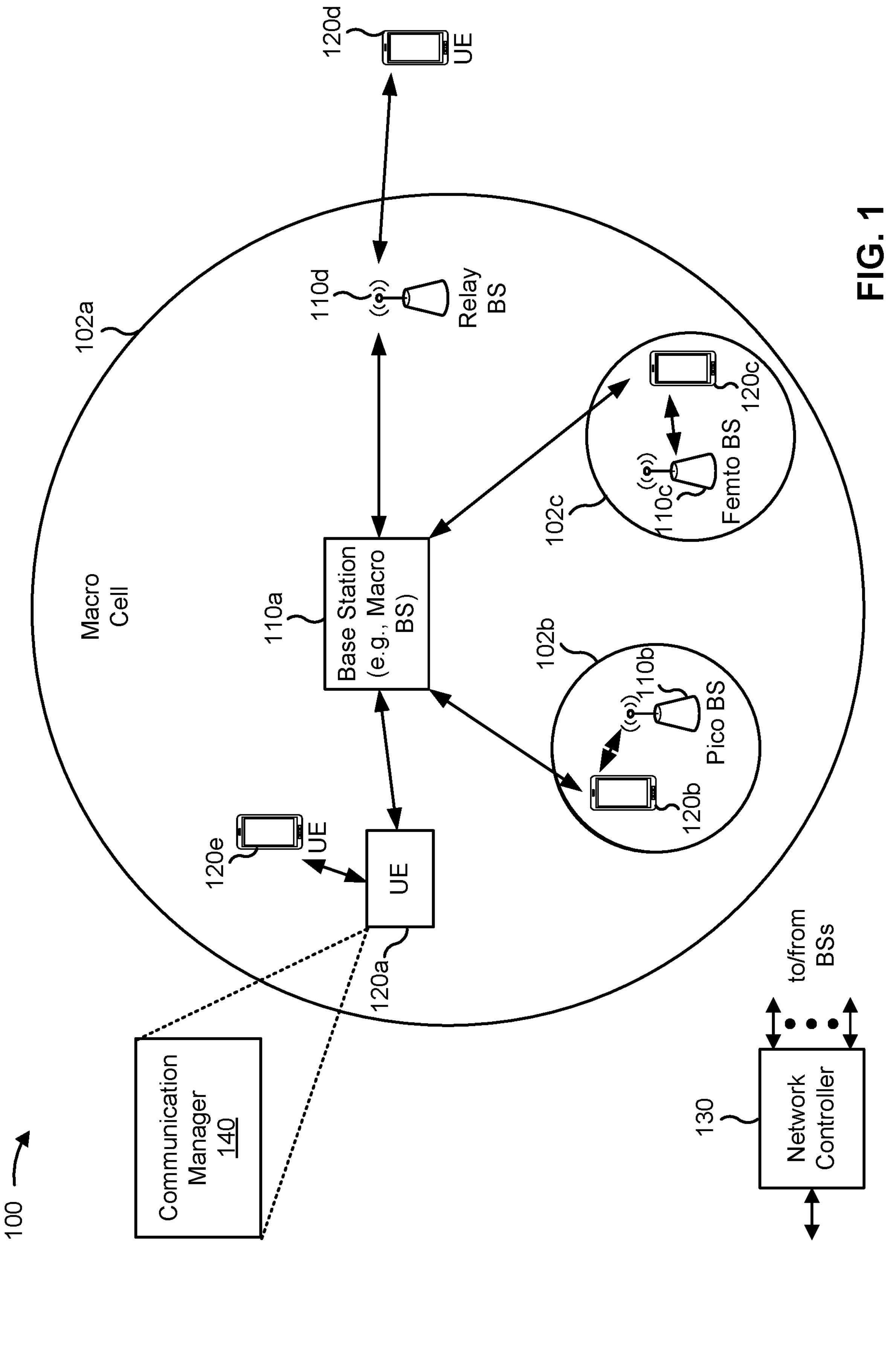
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a second UE, a system information block (SIB) that includes first timing information; and transmit, to the second UE, second timing information associated with an update to the first timing information. Additionally, or alternatively, the communication manager 140 may perform one or more other operations described herein.

In some aspects, the UE 120 may include a communication manager 140. As described in more detail elsewhere herein, the communication manager 140 may receive, from a second UE, a request for a SIB that is associated with a base station; and transmit, to the second UE, the SIB, wherein the SIB includes timing information that is based at least in part on a first time value, associated with first UE, that corresponds to a second time value, associated with the base station. Additionally, or alternatively, the communication manager 140 may perform one or more other operations described herein.

As indicated above, FIG. 1 is provided as an example. Other examples may differ from what is described with regard to FIG. 1.

Figure 2:
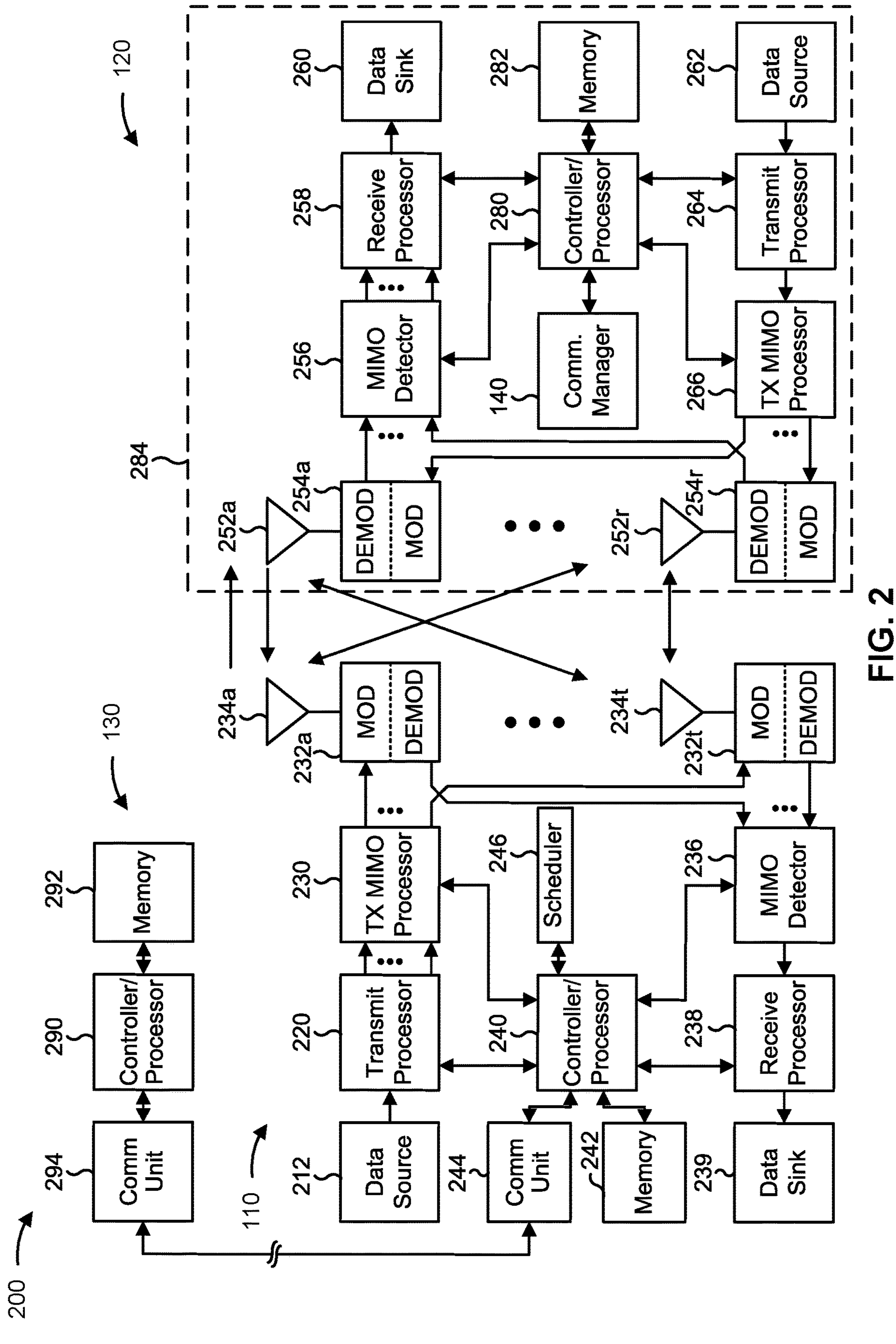
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with SIB delivery in sidelink, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the first UE includes means for transmitting, to a second UE, a SIB that includes first timing information; and/or means for transmitting, to the second UE, second timing information associated with an update to the first timing information. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first UE includes means for receiving, from a second UE, a request for a SIB that is associated with a base station; and/or means for transmitting, to the second UE, the SIB, wherein the SIB includes timing information that is based at least in part on a first time value, associated with first UE, that corresponds to a second time value, associated with the base station. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
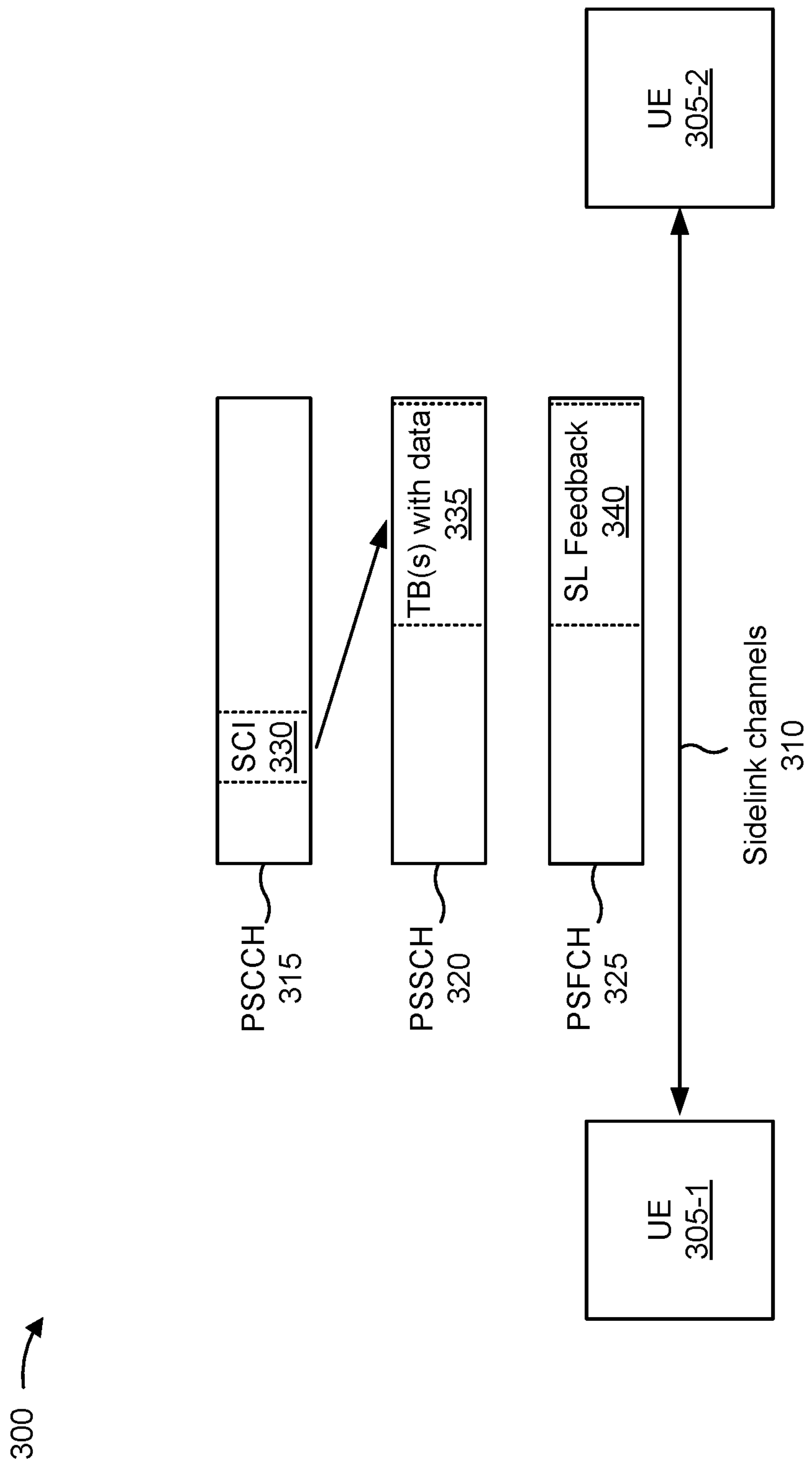
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, as described in more detail herein, the first UE 305-1 may be configured to transmit a SIB to the second UE 305-2 using one or more of the sidelink channels 310.

As indicated above, FIG. 3 is provided as an example. Other examples may differ from what is described with respect to FIG. 3.

Figure 4:
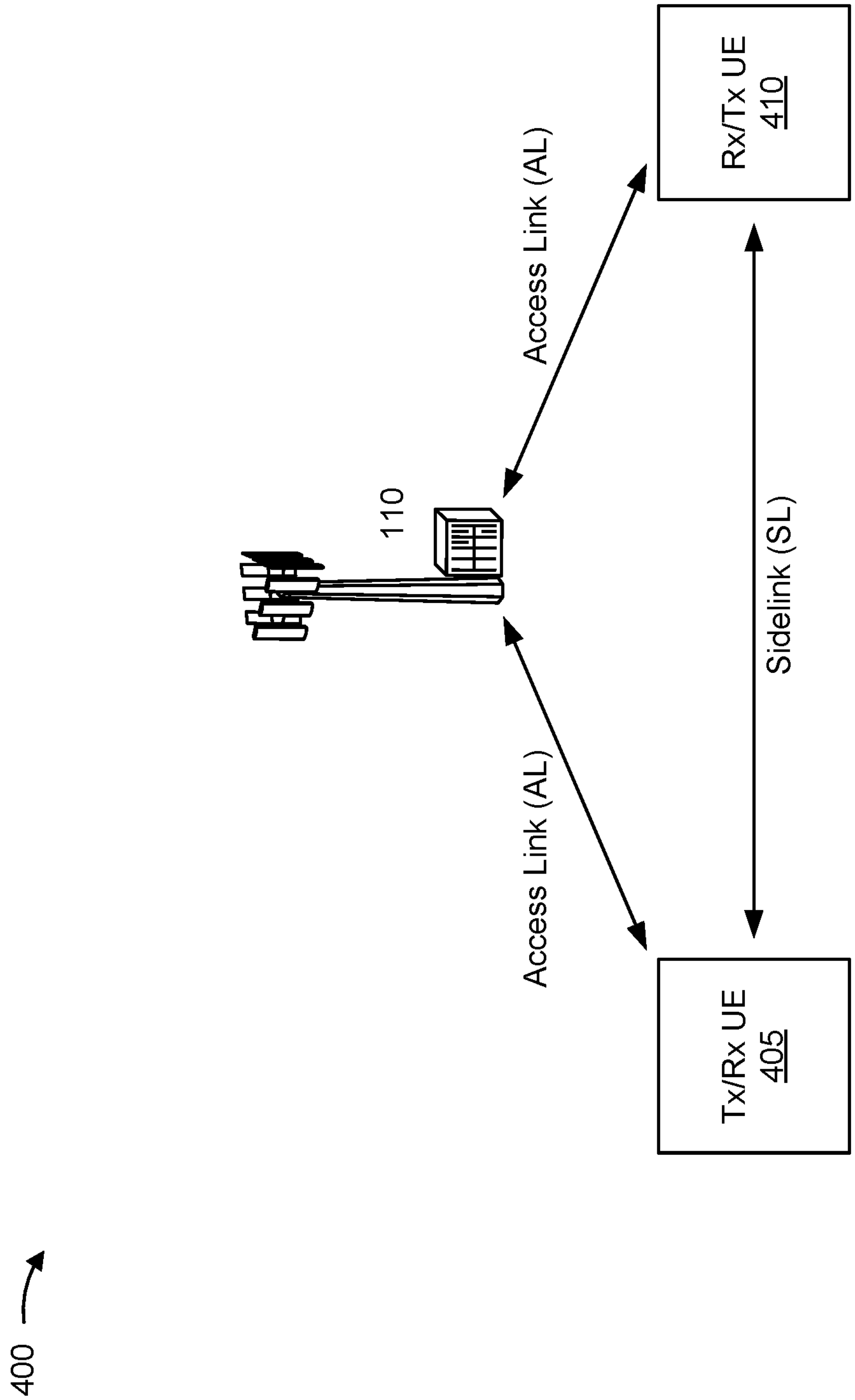
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, as described in more detail herein, the first UE 405 may be configured to transmit a SIB to the second UE 410 using one or more of the sidelink channels.

As indicated above, FIG. 4 is provided as an example. Other examples may differ from what is described with respect to FIG. 4.

Figure 5A:
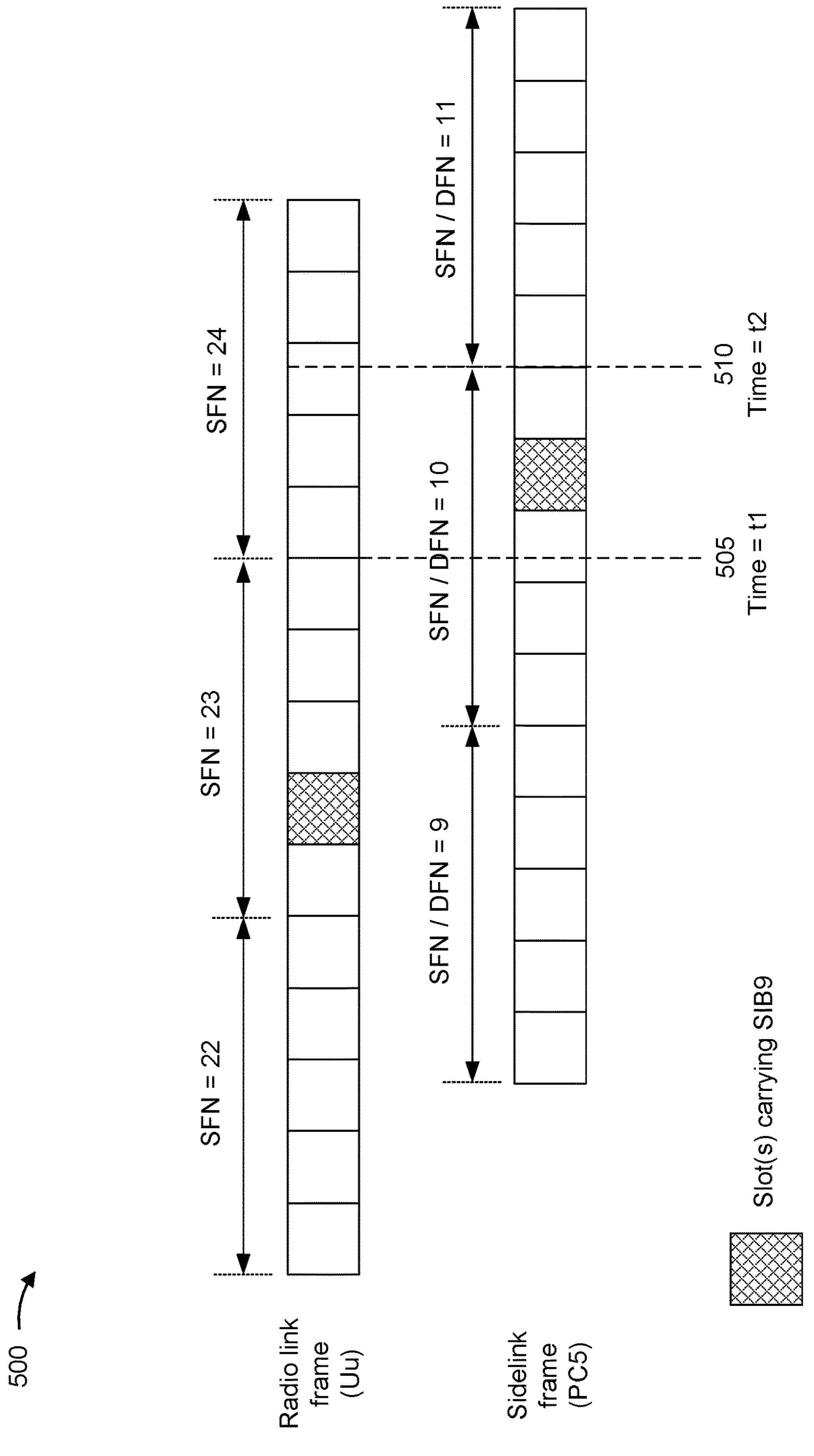
FIGS. 5A and 5B are diagrams illustrating an example of a frame structure for system information block (SIB) communications, in accordance with the present disclosure.
Figure 5B:
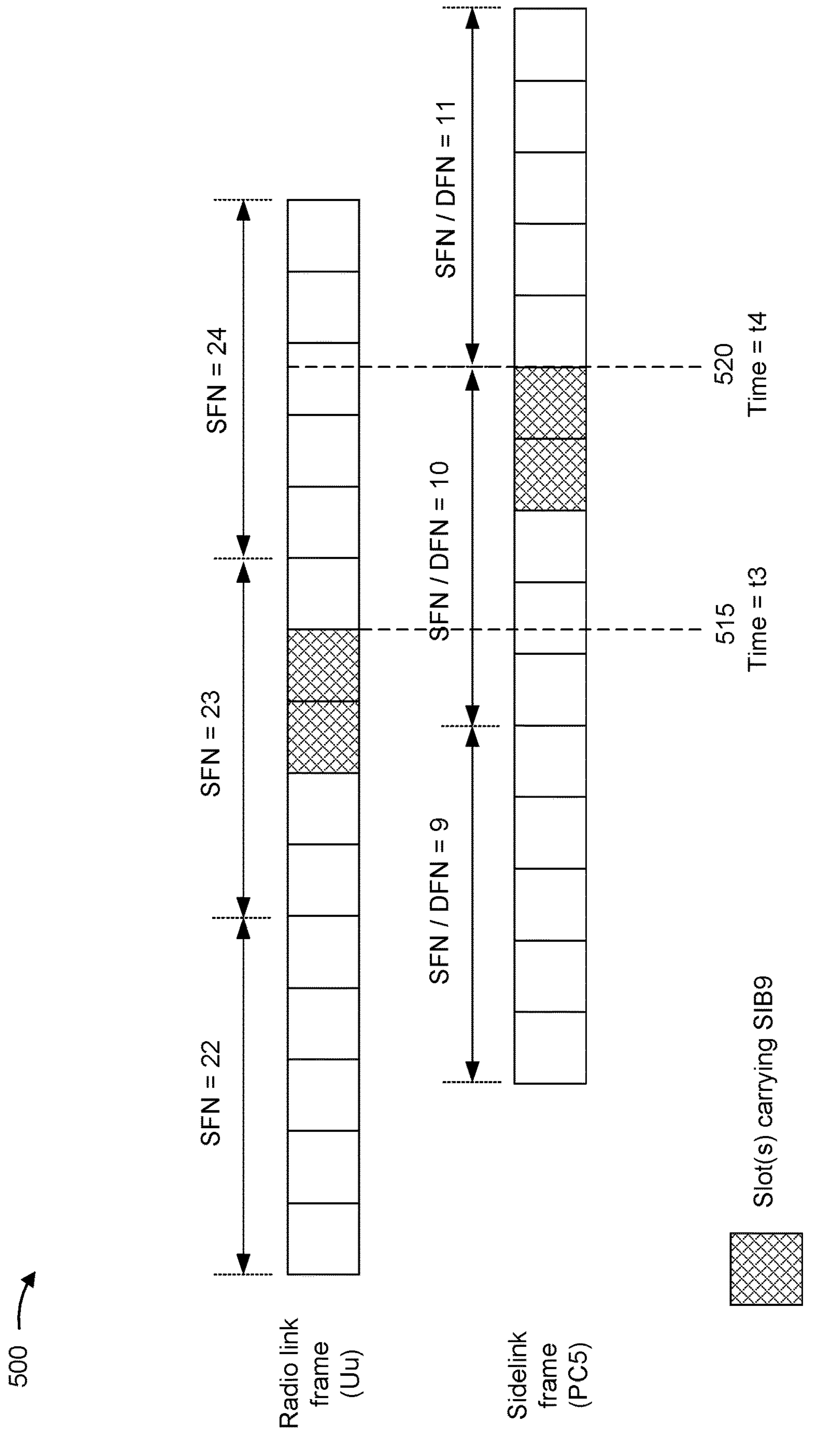

FIGS. 5A and 5B are diagrams illustrating an example 500 of a frame structure for SIB communications, in accordance with the present disclosure.

In some cases, a radio link frame structure for communicating SIBs may include a plurality of frames. Each frame of the plurality of frames may be identified by a system frame number (SFN). For example, a first frame may be identified by SFN 1, a second frame may be identified by SFN 2, etc. Each frame may include a plurality of slots. The frames of the radio link frame structure may be communicated via a Uu interface.

In some cases, a sidelink frame structure for communicating SIBs may include a plurality of frames. Each frame of the plurality of frames may be identified by an SFN or a direct frame number (DFN). For example, a first frame may be identified by SFN 1 (or DFN 1), a second frame may be identified by SFN 2 (or DFN 2), etc. Each frame may include a plurality of slots. The frames of the sidelink frame structure may be communicated via a PC5 interface.

In some cases, the SIB may be a SIB9. The SIB may include timing information, such as timing information associated with the base station 110. For example, the SIB may include GNSS timing information, global positioning system (GPS) timing information, or local timing information, among other examples. A UE may be configured to use the timing information for numerous purposes, including GPS initialization, or clock synchronization, among other examples.

In some cases, a base station, such as the base station 110, may transmit, and a first UE, such as the first UE 120, may receive, a SIB. As shown in FIG. 5A, the SIB may include timing information that corresponds to a boundary (e.g., an end) of a frame of the radio link frame structure. For example, the SIB may include timing information associated with the boundary of the frame identified by SFN 23. However, the boundary of the frame identified by SFN 23 in the radio link frame structure (as shown by dashed line 505) may not correspond to a boundary of a frame in the sidelink frame structure (as shown by dashed line 510).

In some cases, as shown in FIG. 5B, the SIB may include timing information that corresponds to a boundary of a system information window, such as the boundary of a last slot, of one or more slots, that includes the SIB. For example, the SIB may include timing information associated with slot 4 of the frame corresponding to SFN 23. However, the boundary of the system information window in the radio link frame structure (as shown by dashed line 515) may not correspond to a boundary of a system information window in the sidelink frame structure (as shown by dashed line 520).

As shown in FIGS. 5A and 5B, the SIB transmitted from the base station 110 to the first UE 120 may include timing information associated with a frame boundary, or a system information window boundary, of a radio link frame structure. However, the timing information associated with the frame boundary, or the system information window boundary, of the radio link frame structure, may not align with a frame boundary, or a system information window boundary, of a sidelink frame structure used for communications between the first UE 120 and the second UE 120. In some cases, the second UE 120 may request that the first UE 120 transmit the SIB to the second UE 120, for example, if the second UE 120 is not in communication (e.g., is out of range) with the base station 110. However, since the radio link frame structure and the sidelink frame structures are not aligned, the timing information associated with the SIB may not be accurate.

Techniques and apparatuses are described herein for SIB delivery in sidelink. In some aspects, the first UE may transmit, to the second UE, a SIB (e.g., SIB9) that includes first timing information. The first timing information may include a system frame number, and a time value, associated with a frame boundary in a radio link frame structure used for communications between the first UE and a base station. The first UE may transmit, to the second UE, second timing information associated with an update (e.g., correction) to the first timing information. For example, the second timing information may include a system frame number and/or a corresponding time value associated with a frame boundary in the sidelink frame structure used for communications between the first UE and the second UE.

As described above, the first UE may transmit (e.g., relay) the SIB to the second UE. However, since the frames of the radio link frame structure, used for communicating the SIB from the base station to the first UE, are not aligned with the frames of the sidelink frame structure, used for communicating the SIB from the first UE to the second UE, the timing information for the SIB may not be accurate. The first UE may be configured to transmit second timing information that indicates an SFN and/or timing information corresponding to a frame boundary in the sidelink frame structure, thereby increasing the accuracy of the timing information for the SIB. Additionally, by forwarding the SIB in a first communication, and transmitting the second timing information in a second communication, the first UE may reduce errors in the timing information due to propagation delays.

As indicated above, FIGS. 5A and 5B are provided as examples. Other examples may differ from what is described with respect to FIGS. 5A and 5B.

Figure 6:
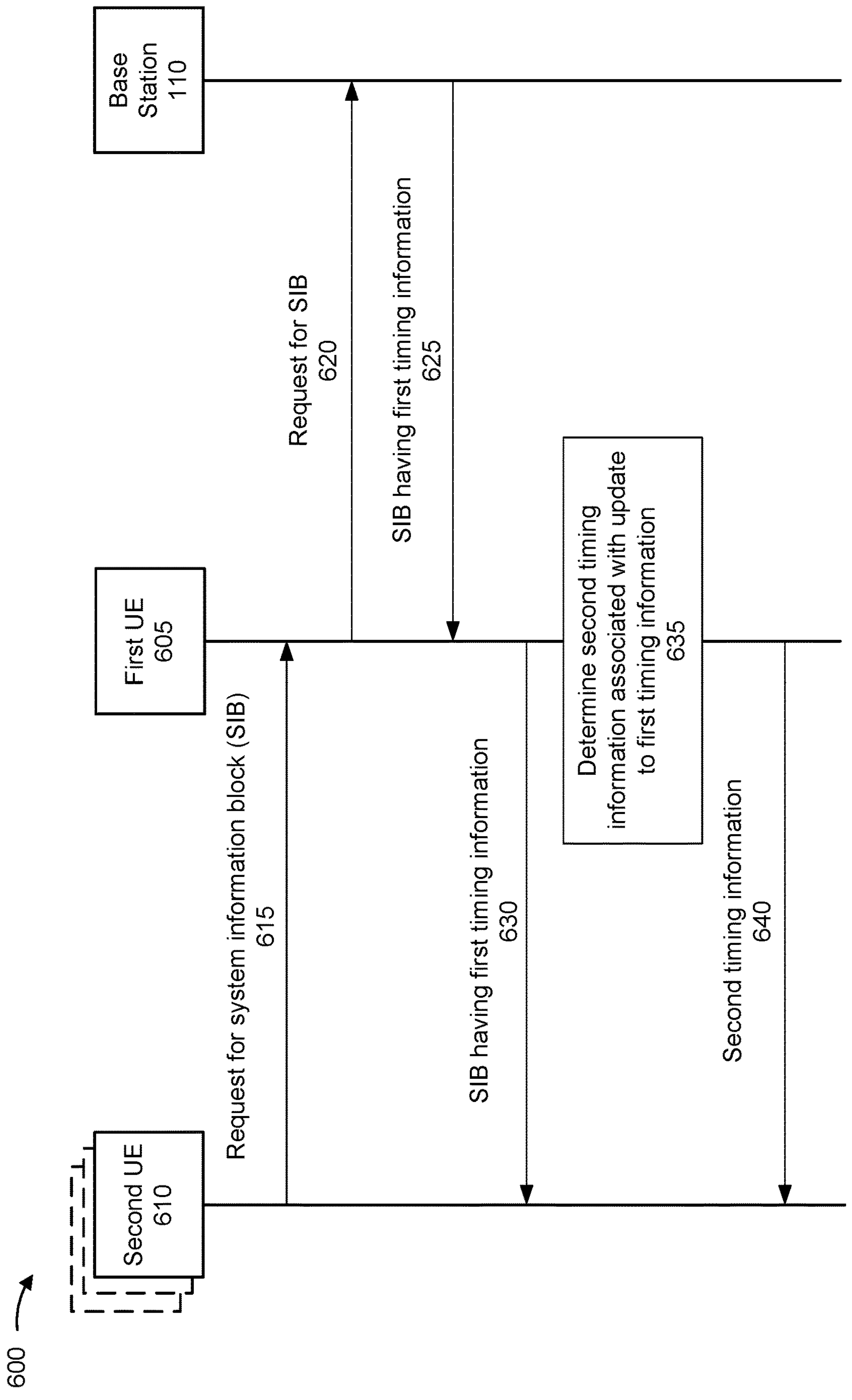
FIG. 6 is a diagram illustrating a first example associated with system information block delivery in sidelink, in accordance with the present disclosure.

FIG. 6 is a diagram illustrating an example 600 of SIB delivery in sidelink, in accordance with the present disclosure. A UE, such as the first UE 605, may communicate with another UE, such as the second UE 610, and a base station, such as the base station 110. The first UE 605 and the second UE 610 may include some or all of the features of the UE 120.

As shown in connection with reference number 615, the second UE 610 may transmit, and the first UE 605 may receive, a request for a SIB. As described herein, the request for the SIB may be a request for a SIB associated with the base station 110, such as a request for a SIB9 associated with the base station 110. In some aspects, the second UE 610 may not be in communication with the base station 110. For example, the second UE 610 may be out of a communication range of the base station 110, or the second UE 610 may not be authorized to communicate with the base station 110, among other examples. The second UE 610 may determine to transmit the request for the SIB to the first UE 605 based at least in part on the second UE 610 not being in communication with the base station 110. In some aspects, the request for the SIB may include an indication of the base station 110. For example, the request for the SIB may include an identifier associated with the base station 110.

As shown in connection with reference number 620, the first UE 605 may transmit, and the base station 110 may receive, the request for the SIB. In some aspects, transmitting the request for the SIB, by the first UE 605, may include relaying the request for the SIB. For example, the first UE 605 may receive, from the second UE 610, the request for the SIB, and may relay (e.g., forward) the request for the SIB to the base station 110. The first UE 605 may relay the request for the SIB to the base station 110 based at least in part on the second UE 610 not being able to communicate with the base station 110.

As shown in connection with reference number 625, the base station 110 may transmit, and the first UE 605 may receive, a SIB having first timing information. For example, the SIB may include GNSS timing information, GPS timing information, or local timing information, among other examples. The first timing information may correspond, or may approximately correspond, to the time at which the SIB is transmitted by the base station 110. As described herein, the timing information may correspond to an SFN boundary associated with frame in which the SIB is transmitted, or the timing information may correspond to a system information window boundary associated with one or more slots in which the SIB is transmitted, among other examples. In some aspects, the first timing information may be highly accurate timing information. For example, the SIB may indicate a millisecond, a microsecond, and/or a nanosecond associated with the first timing information. In some aspects, the SIB may be carried in a system information message. In some aspects, the base station 110 may transmit the SIB, to the first UE 605, via a unicast communication. In some aspects, the base station 110 may transmit the SIB via a broadcast communication.

As shown in connection with reference number 630, the first UE 605 may transmit, and the second UE 610 may receive, the SIB having the first timing information. In some aspects, transmitting the SIB may include transmitting a Layer 2 communication (e.g., a data link layer communication). Thus, the SIB may be transmitted in a Layer 2 communication or may be transmitted as part of a Layer 2 communication. In some aspects, transmitting the SIB may include transmitting a Layer 3 communication (e.g., an Internet Protocol (IP) communication). Thus, the SIB may be transmitted in a Layer 3 communication or may be transmitted as part of a Layer 3 communication.

In some aspects, the first UE 605 may transmit (e.g., relay) the SIB to the second UE 610 within a time period of receiving the SIB from the base station 110. For example, the first UE 605 may be configured to transmit the SIB to the second UE 610 within a time period T of receiving the SIB from the base station 110. In some aspects, the time period T may correspond to a duration of a determined number of frames. Thus, the first UE 605 may be configured to transmit the SIB to the second UE 610 in a time period T that is less than a duration of the determined number of frames, or equal to the duration of the determined number of frames. In some aspects, the determined number of frames may be a single frame, or may be multiple frames. In some aspects, the first UE 605 may transmit the SIB to the second UE 610 within the time period in order to reduce propagation delays, as described in more detail below.

In some aspects, the first UE 605 may transmit the SIB having the first timing information, to the second UE 610, via a sidelink communication. In some aspects, the first UE 605 may transmit the SIB having the first timing information to a plurality of UEs. The transmission to the plurality of UEs may be a broadcast communication. For example, the first UE 605 may transmit the SIB, via a broadcast communication, or via a groupcast communication, to a plurality of UEs that includes the second UE 610 and at least one other UE.

As shown in connection with reference number 635, the first UE 605 may determine second timing information associated with an update (e.g., a correction) to the first timing information.

As described herein, the first timing information may indicate an SFN associated with the communication of the SIB from the base station 110 to the first UE 605. For example, the first timing information may indicate a frame boundary, or a system information window boundary, of one or more frames of the radio link frame structure used for communicating the SIB from the base station 110 to the first UE 605 (e.g., via the Uu interface). However, the first UE 605 may be configured to transmit the SIB, to the second UE 610, using a sidelink communication (e.g., via the PC5 interface). Thus, the first timing information included in the SIB may not be accurate. For example, the frame boundary, or system information window boundary, of the radio link frame structure may not correspond (e.g., in the time domain) to a frame boundary, or system information window boundary, of the sidelink frame structure.

In some aspects, the second timing information may indicate an SFN or DFN, such as an SFN or DFN associated with the sidelink frame structure. In some aspects, the SFN or DFN may be based at least in part on a frame boundary. Referring to the example of FIG. 5A, the first timing information may include an indication of SFN 23 (e.g., since the SIB was transmitted in slot 2 of the frame corresponding to SFN 23 of the radio link frame structure). In contrast, the second timing information may include an indication of SFN/DFN 10. For example, the first UE 605 may determine that the SIB was transmitted in slot 4 of the frame corresponding to SFN/DFN 10 in the sidelink frame structure, and the first UE 605 may generate the second timing information that includes the indication of SFN/DFN 10.

In some aspects, the SFN or DFN may be based at least in part on a system information window boundary. Referring to the example of FIG. 5B, the first timing information may include an indication of SFN 23 (e.g., since the SIB was transmitted in a system information window that includes slots 2 and 3 of the frame corresponding to SFN 23 of the radio link frame structure). In contrast, the second timing information may include an indication of SFN/DFN 10. For example, the first UE 605 may determine that the SIB was transmitted in a system information window that includes slots 4 and 5 of the frame corresponding to SFN/DFN 10 in the sidelink frame structure, and the first UE 605 may generate the second timing information that includes the indication of SFN/DFN 10.

In some aspects, the second timing information may indicate a timing offset. The timing offset may be based at least in part on a time difference between the frame boundary, or the system information window boundary, of the radio link frame structure, and the corresponding frame boundary, or system information window boundary, of the sidelink frame structure.

In some aspects, the timing offset may be based at least in part on a frame boundary. Referring to the example of FIG. 5A, the first timing information may include an indication of time t1. The time t1 may correspond to a boundary of a frame in the radio link frame structure that includes the SIB (e.g., SFN 23). In contrast, the second timing information may include an indication of time t2, or a timing offset that corresponds to the difference between the time t1 and the time t2. The time t2 may correspond to a boundary of a frame in the sidelink frame structure that includes the SIB (e.g., SFN/DFN 10).

In some aspects, the timing offset may be based at least in part on a system information window boundary. Referring to the example of FIG. 5B, the first timing information may include an indication of time t3. The time t3 may correspond to a boundary of a frame in the radio link frame structure that includes the SIB (e.g., SFN 23). In contrast, the second timing information may include an indication of time t4, or a timing offset that corresponds to the difference between the time t3 and the time t4. The time t4 may correspond to a system information window boundary in the sidelink frame structure that includes the SIB (e.g., SFN/DFN 10).

In some aspects, the second timing information may include any combination of the system frame number, system information window number, the time associated with the sidelink frame structure, or the timing offset, among other examples. For example, the second timing information may include the system frame number and the timing offset, or the system information window number and the timing offset.

In some aspects, the second UE 610 may receive the second timing information and may update the SIB based at least in part on the second timing information. For example, the second UE 610 may update an SFN field of the SIB with the SFN/DFN indicated in the second timing information. Additionally, or alternatively, the second UE 610 may update a time value associated with the first timing information based at least in part on the timing offset indicated in the second timing information.

In some aspects, the second timing information may be determined based at least in part on a propagation delay. The propagation delay may correspond the delay between a time that information (e.g., the SIB) is transmitted by a first device, and a time that the information is received by a second device. In some aspects, the second timing information may be based at least in part on two different types of propagation delay.

The first type of propagation delay (PD1) may be the propagation delay between the base station 110 and the first UE 605. For example, the first type of propagation delay may be the delay between the time the SIB is transmitted by the base station 110 and the time the SIB is received by the first UE 605. The first UE 605 may be configured to determine the first type of propagation delay. For example, the first UE 605 may be configured to determine the first type of propagation delay prior to transmitting the second timing information.

The second type of propagation delay may be the propagation delay between the first UE 605 and the second UE 610. In some aspects, the second type of propagation delay may be determined as follows:

At step 1, the first UE 605 may transmit a sidelink frame i to the second UE 610, and may record the transmission time as T1.

At step 2, the second UE 610 may receive the sidelink frame i and may record the time of arrival of the first detected path as T2.

At step 3, the second UE 610 may transmit a sidelink frame j to the first UE 605, and may record transmission time as T3.

At step 4, the first UE 605 may receive the sidelink frame j and may record the time of arrival of the first detected path as T4.

At step 5, the following calculations may be performed:

The second UE 610 may calculate: $\text{SecondUE}_{RX\text{-}TXdiff}=T_4-T_1$.

The first UE 605 may calculate: $\text{FirstUE}_{RX\text{-}TXdiff}=T_3-T_2$. This quantity can be positive or negative depending on the whether the base station 110 transmits the downlink frame before, or after, receiving the uplink frame.

At step 6, the first UE 605 may calculate second type of propagation delay as follows: $PD2=(\text{FirstUE}_{RX\text{-}TXdiff})+(\text{SecondUE}_{RX\text{-}TXdiff})$.

As shown in connection with reference number 640, the first UE 605 may transmit, and the second UE 610 may receive, the second timing information. The second timing information may include, or may indicate, an SFN, a DFN, a timing value, a timing offset, the first propagation delay, and/or the second propagation delay, among other examples.

In some aspects, the first UE 605 may transmit the second timing information via a medium access control (MAC) control element (CE) (MAC-CE). In some aspects, the first UE 605 may transmit the second timing information via an RRC message. In some aspects, the first UE 605 may transmit the second timing information, to the second UE 610, via a sidelink communication. In some aspects, the first UE 605 may transmit the second timing information to a plurality of UEs. The transmission to the plurality of UEs may be a broadcast communication. For example, the first UE 605 may transmit the second timing information, via a broadcast communication, to a plurality of UEs that includes the second UE 610 and at least one other UE.

As described above, the first UE 605 may transmit (e.g., relay) the SIB to the second UE 610. However, since the frames of the radio link frame structure, used for communicating the SIB from the base station 110 to the first UE 605, are not aligned with the frames of the sidelink frame structure, used for communicating the SIB from the first UE 605 to the second UE 610, the timing information for the SIB may not be accurate. The first UE 605 may transmit the second timing information that indicates the SFN and/or the timing information corresponding to the frame boundary in the sidelink frame structure, thereby increasing the accuracy of the timing information for the SIB. Additionally, by forwarding the SIB in a first communication, and transmitting the second timing information in a second communication, the first UE 605 may reduce errors in the timing information due to the propagation delays.

As indicated above, FIG. 6 is provided as an example. Other examples may differ from what is described with respect to FIG. 6.

Figure 7:
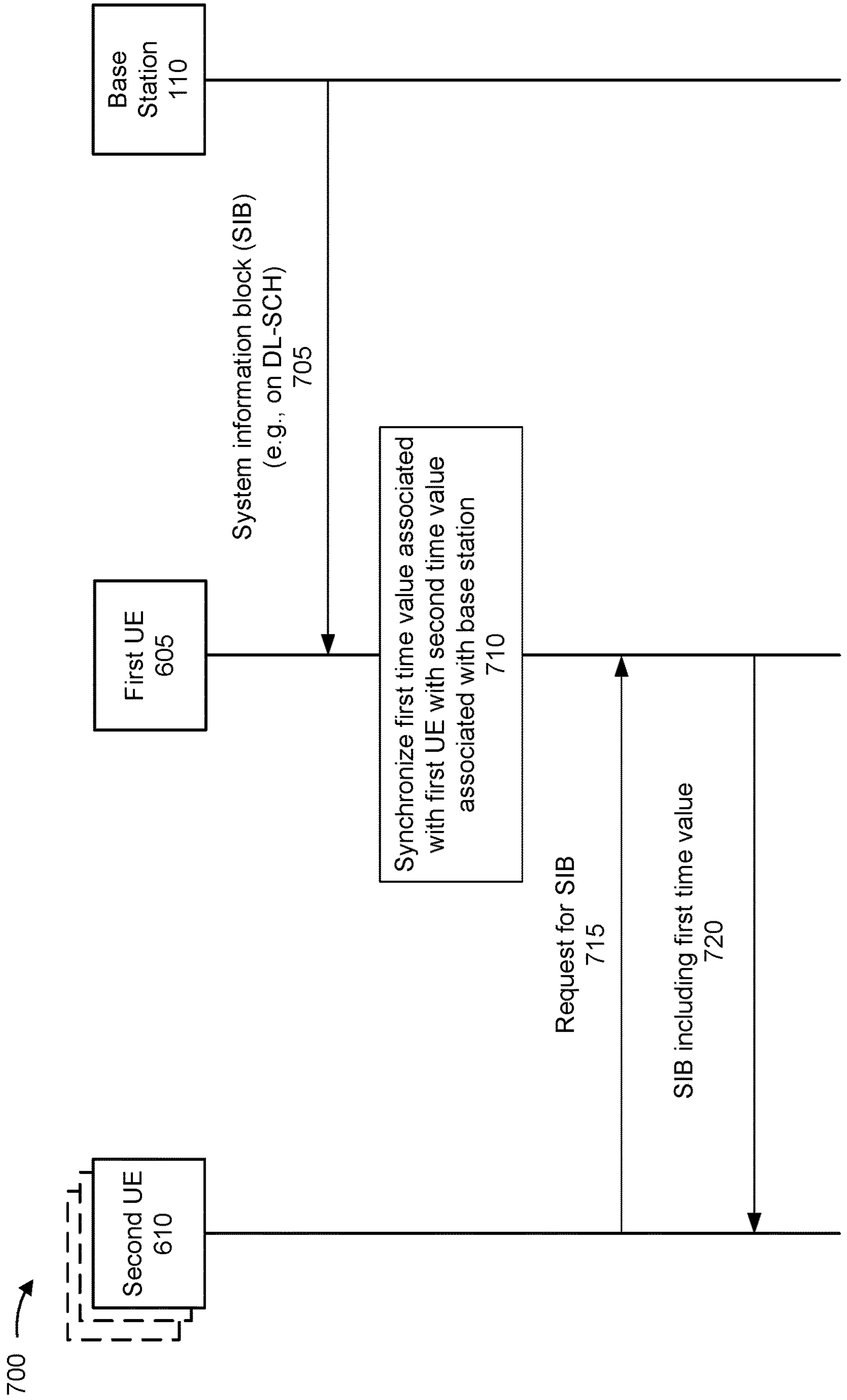
FIG. 7 is a diagram illustrating a second example associated with system information block delivery in sidelink, in accordance with the present disclosure.

FIG. 7 is a diagram illustrating an example 700 of SIB delivery in sidelink, in accordance with the present disclosure. A UE, such as the first UE 605, may communicate with another UE, such as the second UE 610, and a base station, such as the base station 110. The first UE 605 and the second UE 610 may include some or all of the features of the UE 120.

As shown in connection with reference number 705, the base station 110 may transmit, and the first UE 605 may receive, a SIB. The SIB may be transmitted by the base station 110, and received by the first UE 605, via a downlink shared channel (DL-SCH). In some aspects, the SIB may be a SIB9. In some aspects, the SIB may include timing information, such as GNSS timing information, GPS timing information, or local timing information, among other examples. The timing information may correspond, or may approximately correspond, to the time at which the SIB is transmitted by the base station 110. In some aspects, the timing information may be highly accurate timing information. For example, the SIB may indicate a millisecond, a microsecond, and/or a nanosecond associated with the timing information. In some aspects, the base station 110 may transmit the SIB, to the first UE 605, via a unicast communication. In some aspects, the base station 110 may transmit the SIB via a broadcast communication.

As shown in connection with reference number 710, the first UE 605 may synchronize a first time value, associated with the first UE 605, with a second time value, associated with the base station 110. For example, the first time value associated with the first UE 605 may be based at least in part on a first clock associated with the first UE 605. The second time value may correspond to the timing information received from the base station 110, such as the timing information indicated in the SIB. For example, the second time value (e.g., the timing information) may be based at least in part on a second clock associated with the base station 110. The first UE 605 may be configured to synchronize the first time value (e.g., the first clock) with the second time value (e.g., the second clock). Synchronizing the first time value may comprise setting the first time value to be equal to, or substantially equal to, the second time value.

As shown in connection with reference number 715, the second UE 610 may transmit, and the first UE 605 may receive, a request for a SIB. In some aspects, the second UE 610 may not be in communication with the base station 110. For example, the second UE 610 may be out of a communication range of the base station 110, or the second UE 610 may not be authorized to communicate with the base station 110, among other examples. The second UE 610 may determine to transmit the request for the SIB to the first UE 605 based at least in part on the second UE 610 not being in communication with the base station 110. In some aspects, the request for the SIB may include an indication of the base station. For example, the request for the SIB may include an identifier associated with the base station 110.

As shown in connection with reference number 720, the first UE 605 may transmit, and the second UE 610 may receive, the SIB. The SIB may include timing information that is based at least in part on the first time value. For example, the SIB may include timing information that is based at least in part on a first time value, associated with first UE 605, that corresponds to a second time value, associated with the base station 110.

In some aspects, the first UE 605 may generate the SIB based at least in part on receiving the request for the SIB. For example, the request for the SIB may indicate a request for a time value (e.g., a GNSS time value). The request for the SIB may indicate a request for a time value associated with the base station 110. However, since the first time value (e.g., the first clock) of the first UE 605 is synchronized with the second time value (e.g., the second clock) of the base station 110, the first UE 605 may determine that the first UE 605 does not need to relay the request for the SIB to the base station 110. Instead, the first UE 605 may generate the SIB having the first time value that is synchronized with the second time value associated with the base station 110. In some aspects, the SIB may be generated based at least in part on a propagation delay, such as the second type of propagation delay described above in connection with FIG. 6.

In some aspects, the first UE 605 may transmit the SIB to the second UE 610 using a sidelink communication. For example, the SIB may be communicated via a new sidelink signaling radio bearer (SL-SRB), or an existing SL-SRB, having a control plane protocol stack. In some aspects, there may be no ciphering or integrity protection at the packet data convergence protocol (PDCP).

In some aspects, transmitting the SIB may include transmitting a Layer 2 communication (e.g., a data link layer communication). Thus, the SIB may be transmitted in a Layer 2 communication or may be transmitted as part of a Layer 2 communication. In some aspects, transmitting the SIB may include transmitting a Layer 3 communication (e.g., an IP communication). Thus, the SIB may be transmitted in a Layer 3 communication or may be transmitted as part of a Layer 3 communication. In some aspects, the first UE 605 may transmit the SIB to a plurality of UEs. The transmission to the plurality of UEs may be a broadcast communication. For example, the first UE 605 may transmit the SIB, via a broadcast communication, to a plurality of UEs that includes the second UE 610 and at least one other UE.

In some aspects, the first UE 605 and the second UE 610 may use P2P forwarding in order to switch in and out of coverage synchronization (e.g., with the base station 110), without the need to perform multiple SIB (e.g., SIB9) communications or synchronizations. For example, the first UE 605 and/or the second UE 610 may perform a best master clock algorithm (BMCA) to synchronize with the best master clock, thus maintaining clock accuracy in and out of coverage with the base station 110. In some aspects, the first clock associated with the first UE 605 may be synchronized in accordance with the SIB, as described above. The second UE 610 may be configured to synchronize a third clock, associated with the second UE 610, with the second clock, associated with the base station 110, if the second UE 610 is within a coverage area of the base station 110. Alternatively, the second UE 610 may synchronize the third clock with the first clock, if the second UE 610 is not within a coverage area of the base station 110.

As described above, the first UE 605 may reduce network traffic by generating the SIB at first UE 605. For example, the first UE 605 may generate the SIB, rather than transmitting (e.g., relaying) the request for the SIB to the base station 110. Since the first time value associated with the first UE 605 is synchronized with the second time value associated with the base station 110, the first UE 605 may provide a highly accurate SIB without the need for additional communications between the first UE 605 and the base station 110. Additionally, eliminating the communications between the first UE 605 and the base station 110 may reduce propagation delays. In particular, eliminating the communications between the first UE 605 and the base station 110 may eliminate the PD1.

As indicated above, FIG. 7 is provided as an example. Other examples may differ from what is described with respect to FIG. 7.

Figure 8:
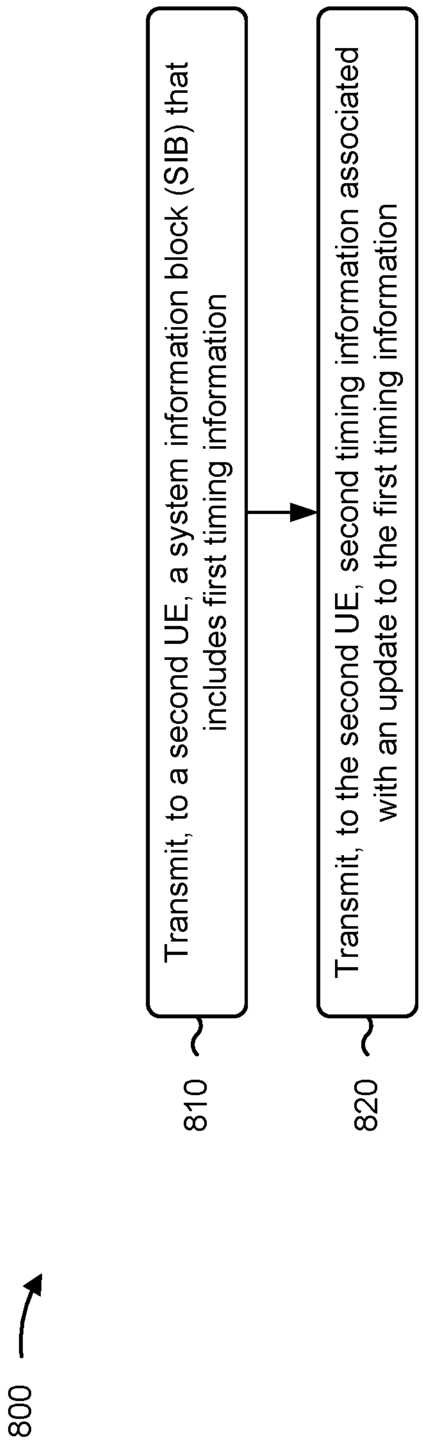
FIG. 8 is a diagram illustrating a first example process associated with system information block delivery in sidelink, in accordance with the present disclosure.

FIG. 8 is a diagram illustrating an example process 800 performed, for example, by a first UE, in accordance with the present disclosure. Example process 800 is an example where the UE (e.g., UE 120) performs operations associated with SIB delivery in sidelink.

As shown in FIG. 8, in some aspects, process 800 may include transmitting, to a second UE, a SIB that includes first timing information (block 810). For example, the UE (e.g., using communication manager 140 and/or transmission component 1004, depicted in FIG. 10) may transmit, to a second UE, a SIB that includes first timing information, as described above.

As further shown in FIG. 8, in some aspects, process 800 may include transmitting, to the second UE, second timing information associated with an update to the first timing information (block 820). For example, the UE (e.g., using communication manager 140 and/or transmission component 1004, depicted in FIG. 10) may transmit, to the second UE, second timing information associated with an update to the first timing information, as described above.

Process 800 may include additional aspects, such as any single aspect or any combination of aspects described below and/or in connection with one or more other processes described elsewhere herein.

In a first aspect, the second timing information indicates a system frame number or a direct frame number.

In a second aspect, alone or in combination with the first aspect, the second timing information indicates a timing offset.

In a third aspect, alone or in combination with one or more of the first and second aspects, process 800 includes determining the second timing information based at least in part on a difference between a system frame number boundary, or system information window boundary, in a first communication, and a corresponding system frame number boundary, direct frame number boundary, or system information window boundary, in a second communication.

In a fourth aspect, alone or in combination with one or more of the first through third aspects, the first communication is a communication of the SIB using a radio link communication, and the second communication is a communication of the SIB using a sidelink communication.

In a fifth aspect, alone or in combination with one or more of the first through fourth aspects, process 800 includes receiving, from a base station, the SIB that includes the first timing information.

In a sixth aspect, alone or in combination with one or more of the first through fifth aspects, transmitting the SIB comprises transmitting the SIB to the second UE within a time period of receiving the SIB from the base station.

In a seventh aspect, alone or in combination with one or more of the first through sixth aspects, the time period is less than a duration of a determined number of frames, or equal to a duration of the determined number of frames.

In an eighth aspect, alone or in combination with one or more of the first through seventh aspects, process 800 includes determining the update to the first timing information based at least in part on a propagation delay between the first UE and the second UE, or a propagation delay between the first UE and the base station.

In a ninth aspect, alone or in combination with one or more of the first through eighth aspects, the SIB is received from the base station via a unicast transmission or a broadcast transmission.

In a tenth aspect, alone or in combination with one or more of the first through ninth aspects, the second UE is not in communication with the base station.

In an eleventh aspect, alone or in combination with one or more of the first through tenth aspects, transmitting the second timing information comprises transmitting the second timing information via a medium access control message or a radio resource control message.

In a twelfth aspect, alone or in combination with one or more of the first through eleventh aspects, process 800 includes receiving, from the second UE, a request for the SIB, and transmitting, to a base station, the request for the SIB.

In a thirteenth aspect, alone or in combination with one or more of the first through twelfth aspects, the request for the SIB includes an indication of the base station.

In a fourteenth aspect, alone or in combination with one or more of the first through thirteenth aspects, transmitting the SIB comprises relaying the SIB from a base station to the second UE.

In a fifteenth aspect, alone or in combination with one or more of the first through fourteenth aspects, process 800 includes transmitting the SIB, to a plurality of UEs that includes the second UE, via a first broadcast communication, and transmitting the second timing information, to the plurality of UEs, via a second broadcast communication.

In a sixteenth aspect, alone or in combination with one or more of the first through fifteenth aspects, the first timing information is GNSS timing information.

In a seventeenth aspect, alone or in combination with one or more of the first through sixteenth aspects, the SIB is a SIB9.

In an eighteenth aspect, alone or in combination with one or more of the first through seventeenth aspects, the SIB is transmitted via a first sidelink communication and the second timing information is transmitted via a second sidelink communication.

In a nineteenth aspect, alone or in combination with one or more of the first through eighteenth aspects, transmitting the SIB comprises transmitting a Layer 2 communication or a Layer 3 communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
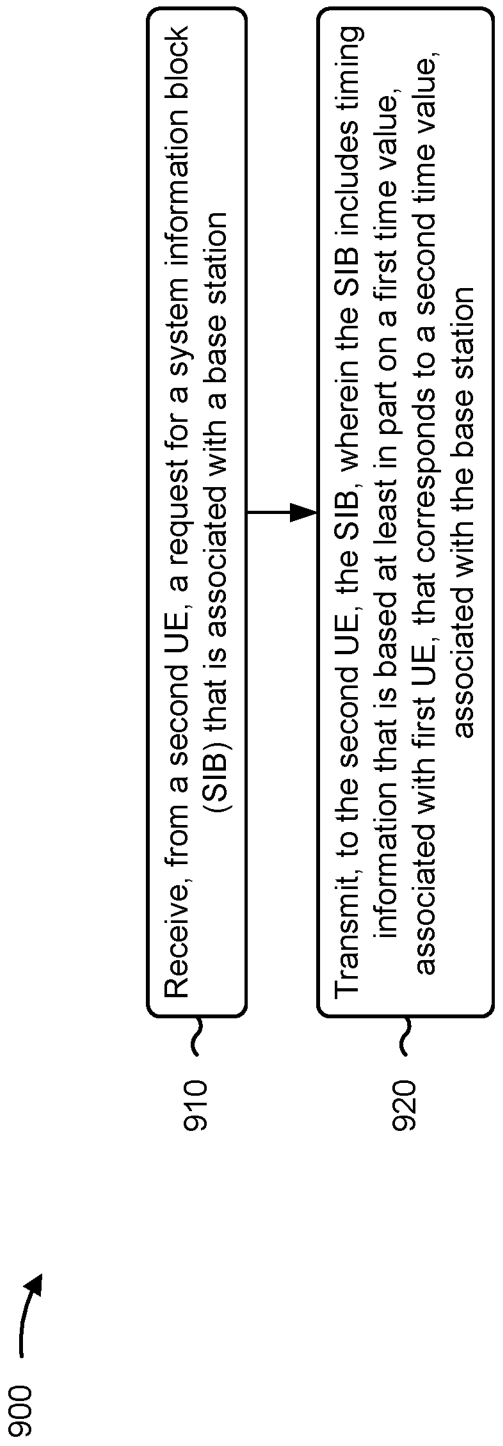
FIG. 9 is a diagram illustrating a second example process associated with system information block delivery in sidelink, in accordance with the present disclosure.

FIG. 9 is a diagram illustrating an example process 900 performed, for example, by a UE, in accordance with the present disclosure. Example process 900 is an example where the UE (e.g., UE 120) performs operations associated with SIB delivery in sidelink.

As shown in FIG. 9, in some aspects, process 900 may include receiving, from a second UE, a request for a SIB that is associated with a base station (block 910). For example, the UE (e.g., using communication manager 140 and/or reception component 1002, depicted in FIG. 10) may receive, from a second UE, a request for a SIB that is associated with a base station, as described above.

As further shown in FIG. 9, in some aspects, process 900 may include transmitting, to the second UE, the SIB, wherein the SIB includes timing information that is based at least in part on a first time value, associated with first UE, that corresponds to a second time value, associated with the base station (block 920). For example, the UE (e.g., using communication manager 140 and/or transmission component 1004, depicted in FIG. 10) may transmit, to the second UE, the SIB, wherein the SIB includes timing information that is based at least in part on a first time value, associated with first UE, that corresponds to a second time value, associated with the base station, as described above.

Process 900 may include additional aspects, such as any single aspect or any combination of aspects described below and/or in connection with one or more other processes described elsewhere herein.

In a first aspect, the first time value is based at least in part on a first clock associated with the first UE, and the second time value is based at least in part on a second clock associated with the base station.

In a second aspect, alone or in combination with the first aspect, the first clock is synchronized with the second clock.

In a third aspect, alone or in combination with one or more of the first and second aspects, process 900 includes receiving, from the base station, an indication of the second time value.

In a fourth aspect, alone or in combination with one or more of the first through third aspects, process 900 includes synchronizing the first time value with the second time value.

In a fifth aspect, alone or in combination with one or more of the first through fourth aspects, the indication of the second time value is received via a downlink shared channel.

In a sixth aspect, alone or in combination with one or more of the first through fifth aspects, process 900 includes generating the SIB based at least in part on receiving the request for the SIB.

In a seventh aspect, alone or in combination with one or more of the first through sixth aspects, process 900 includes determining to transmit the SIB, via a sidelink communication, without requesting the SIB from the base station.

In an eighth aspect, alone or in combination with one or more of the first through seventh aspects, the second UE is not in communication with the base station.

In a ninth aspect, alone or in combination with one or more of the first through eighth aspects, process 900 includes transmitting the SIB, to a plurality of UEs that includes the second UE, via a broadcast communication.

In a tenth aspect, alone or in combination with one or more of the first through ninth aspects, the timing information is GNSS timing information.

In an eleventh aspect, alone or in combination with one or more of the first through tenth aspects, the SIB is a SIB9.

In a twelfth aspect, alone or in combination with one or more of the first through eleventh aspects, the SIB is transmitted via a sidelink communication.

In a thirteenth aspect, alone or in combination with one or more of the first through twelfth aspects, transmitting the SIB comprises transmitting a Layer 2 communication or a Layer 3 communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
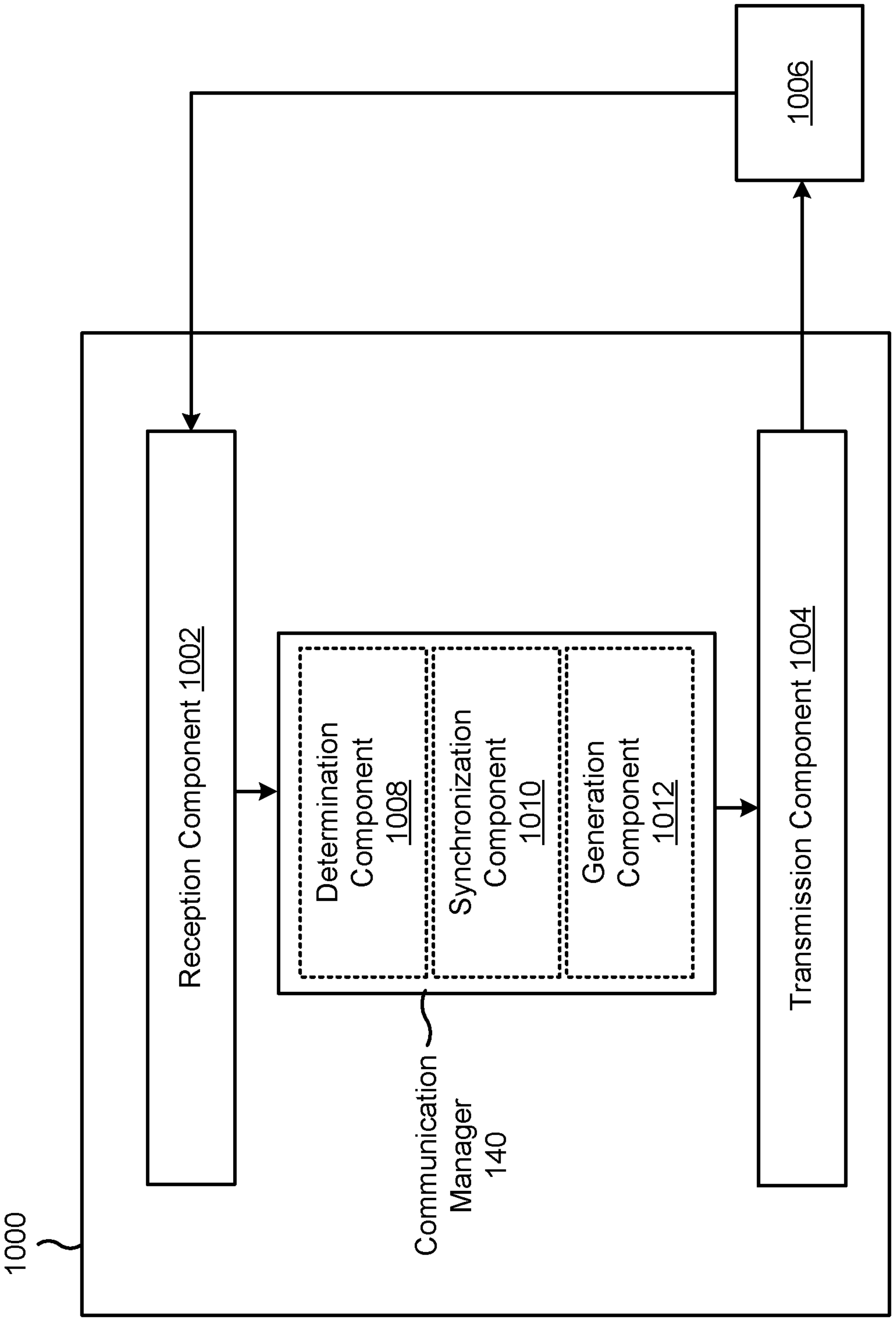
FIG. 10 is a diagram of an example apparatus for wireless communication, in accordance with the present disclosure.

FIG. 10 is a diagram of an example apparatus 1000 for wireless communication. The apparatus 1000 may be a first UE, or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a determination component 1008, a synchronization component 1010, or a generation component 1012, among other examples.

In some aspects, the apparatus 1000 may be configured to perform one or more operations described herein in connection with FIG. 6-7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the first UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first UE described in connection with FIG. 2. In some aspects, the transmission component 1004 may be co-located with the reception component 1002 in a transceiver.

The transmission component 1004 may transmit, to a second UE, a SIB that includes first timing information. The transmission component 1004 may transmit, to the second UE, second timing information associated with an update to the first timing information.

The determination component 1008 may determine the second timing information based at least in part on a difference between a system frame number boundary, or system information window boundary, in a first communication, and a corresponding system frame number boundary, direct frame number boundary, or system information window boundary, in a second communication.

The reception component 1002 may receive, from a base station, the SIB that includes the first timing information.

The determination component 1008 may determine the update to the first timing information based at least in part on a propagation delay between the first UE and the second UE, or a propagation delay between the first UE and the base station.

The reception component 1002 may receive, from the second UE, a request for the SIB.

The transmission component 1004 may transmit, to a base station, the request for the SIB.

The transmission component 1004 may transmit the SIB, to a plurality of UEs that includes the second UE, via a first broadcast communication.

The transmission component 1004 may transmit the second timing information, to the plurality of UEs, via a second broadcast communication.

The reception component 1002 may receive, from a second UE, a request for a SIB that is associated with a base station. The transmission component 1004 may transmit, to the second UE, the SIB, wherein the SIB includes timing information that is based at least in part on a first time value, associated with first UE, that corresponds to a second time value, associated with the base station.

The reception component 1002 may receive, from the base station, an indication of the second time value.

The synchronization component 1010 may synchronize the first time value with the second time value.

The generation component 1012 may generate the SIB based at least in part on receiving the request for the SIB.

The determination component 1008 may determine to transmit the SIB, via a sidelink communication, without requesting the SIB from the base station.

The transmission component 1004 may transmit the SIB, to a plurality of UEs that includes the second UE, via a broadcast communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The Following Provides an Overview of Some Aspects of the Present Disclosure:

Aspect 1: A method of wireless communication performed by a first user equipment (UE), comprising: transmitting, to a second UE, a system information block (SIB) that includes first timing information; and transmitting, to the second UE, second timing information associated with an update to the first timing information.

Aspect 2: The method of Aspect 1, wherein the second timing information indicates a system frame number or a direct frame number.

Aspect 3: The method of any of Aspects 1-2, wherein the second timing information indicates a timing offset.

Aspect 4: The method of any of Aspects 1-3, further comprising determining the second timing information based at least in part on a difference between a system frame number boundary, or system information window boundary, in a first communication, and a corresponding system frame number boundary, direct frame number boundary, or system information window boundary, in a second communication.

Aspect 5: The method of Aspect 4, wherein the first communication is a communication of the SIB using a radio link communication, and the second communication is a communication of the SIB using a sidelink communication.

Aspect 6: The method of any of Aspects 1-5, further comprising receiving, from a base station, the SIB that includes the first timing information.

Aspect 7: The method of Aspect 6, wherein transmitting the SIB comprises transmitting the SIB to the second UE within a time period of receiving the SIB from the base station.

Aspect 8: The method of Aspect 7, wherein the time period is less than a duration of a determined number of frames, or equal to a duration of the determined number of frames.

Aspect 9: The method of Aspect 6, further comprising determining the update to the first timing information based at least in part on a propagation delay between the first UE and the second UE, or a propagation delay between the first UE and the base station.

Aspect 10: The method of Aspect 6, wherein the SIB is received from the base station via a unicast transmission or a broadcast transmission.

Aspect 11: The method of Aspect 6, wherein the second UE is not in communication with the base station.

Aspect 12: The method of any of Aspects 1-11, wherein transmitting the second timing information comprises transmitting the second timing information via a medium access control message or a radio resource control message.

Aspect 13: The method of any of Aspects 1-12, further comprising: receiving, from the second UE, a request for the SIB; and transmitting, to a base station, the request for the SIB.

Aspect 14: The method of Aspect 13, wherein the request for the SIB includes an indication of the base station.

Aspect 15: The method of any of Aspects 1-14, wherein transmitting the SIB comprises relaying the SIB from a base station to the second UE.

Aspect 16: The method of any of Aspects 1-15, further comprising: transmitting the SIB, to a plurality of UEs that includes the second UE, via a first broadcast communication, or a first broadcast communication; and transmitting the second timing information, to the plurality of UEs, via a second broadcast communication, or a second groupcast communication.

Aspect 17: The method of any of Aspects 1-16, wherein the first timing information is global navigation satellite system (GNSS) timing information.

Aspect 18: The method of any of Aspects 1-17, wherein the SIB is a SIB9.

Aspect 19: The method of any of Aspects 1-18, wherein the SIB is transmitted via a first sidelink communication and the second timing information is transmitted via a second sidelink communication.

Aspect 20: The method of any of Aspects 1-19, wherein transmitting the SIB comprises transmitting a Layer 2 communication or a Layer 3 communication.

Aspect 21: A method of wireless communication performed by a first user equipment (UE), comprising: receiving, from a second UE, a request for a system information block (SIB) that is associated with a base station; and transmitting, to the second UE, the SIB, wherein the SIB includes timing information that is based at least in part on a first time value, associated with first UE, that corresponds to a second time value, associated with the base station.

Aspect 22: The method of Aspect 21, wherein the first time value is based at least in part on a first clock associated with the first UE, and the second time value is based at least in part on a second clock associated with the base station.

Aspect 23: The method of Aspect 22, wherein the first clock is synchronized with the second clock.

Aspect 24: The method of any of Aspects 21-23, further comprising receiving, from the base station, an indication of the second time value.

Aspect 25: The method of Aspect 24, further comprising synchronizing the first time value with the second time value.

Aspect 26: The method of Aspect 24, wherein the indication of the second time value is received via a downlink shared channel.

Aspect 27: The method of any of Aspects 21-26, further comprising generating the SIB based at least in part on receiving the request for the SIB.

Aspect 28: The method of any of Aspects 21-27, further comprising determining to transmit the SIB, via a sidelink communication, without requesting the SIB from the base station.

Aspect 29: The method of any of Aspects 21-28, wherein the second UE is not in communication with the base station.

Aspect 30: The method of any of Aspects 21-29, further comprising transmitting the SIB, to a plurality of UEs that includes the second UE, via a broadcast communication, or a groupcast communication.

Aspect 31: The method of any of Aspects 21-30, wherein the timing information is global navigation satellite system (GNSS) timing information.

Aspect 32: The method of any of Aspects 21-31, wherein the SIB is a SIB9.

Aspect 33: The method of any of Aspects 21-32, wherein the SIB is transmitted via a sidelink communication.

Aspect 34: The method of any of Aspects 21-33, wherein transmitting the SIB comprises transmitting a Layer 2 communication or a Layer 3 communication.

Aspect 35: An apparatus for wireless communication at a device, comprising a processor; memory coupled with the processor; and instructions stored in the memory and executable by the processor to cause the apparatus to perform the method of one or more of Aspects 1-20.

Aspect 36: A device for wireless communication, comprising a memory and one or more processors coupled to the memory, the one or more processors configured to perform the method of one or more of Aspects 1-20.

Aspect 37: An apparatus for wireless communication, comprising at least one means for performing the method of one or more of Aspects 1-20.

Aspect 38: A non-transitory computer-readable medium storing code for wireless communication, the code comprising instructions executable by a processor to perform the method of one or more of Aspects 1-20.

Aspect 39: A non-transitory computer-readable medium storing a set of instructions for wireless communication, the set of instructions comprising one or more instructions that, when executed by one or more processors of a device, cause the device to perform the method of one or more of Aspects 1-20.

Aspect 40: An apparatus for wireless communication at a device, comprising a processor; memory coupled with the processor; and instructions stored in the memory and executable by the processor to cause the apparatus to perform the method of one or more of Aspects 21-34.

Aspect 41: A device for wireless communication, comprising a memory and one or more processors coupled to the memory, the one or more processors configured to perform the method of one or more of Aspects 21-34.

Aspect 42: An apparatus for wireless communication, comprising at least one means for performing the method of one or more of Aspects 21-34.

Aspect 43: A non-transitory computer-readable medium storing code for wireless communication, the code comprising instructions executable by a processor to perform the method of one or more of Aspects 21-34.

Aspect 44: A non-transitory computer-readable medium storing a set of instructions for wireless communication, the set of instructions comprising one or more instructions that, when executed by one or more processors of a device, cause the device to perform the method of one or more of Aspects 21-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE), comprising:

one or more antennas; and one or more processors, coupled to one or more memories, configured to cause the first UE to:

receive, from a network entity, a system information block (SIB) that includes first timing information, wherein the first timing information indicates a first time corresponding to a first slot boundary of a first frame of a radio link frame structure used for communicating the SIB from the network entity to the first UE, and wherein the first frame is identified by a system frame number (SFN);

transmit, to a second UE, the SIB, wherein frames of the radio link frame structure, used for communicating the SIB from the network entity to the first UE, are not aligned with frames of a sidelink frame structure used for communicating the SIB from the first UE to the second UE; and transmit, to the second UE, second timing information associated with an update to the SIB, wherein the second timing information indicates a timing offset that corresponds to a time difference between the first time and a second time corresponding to a second slot boundary of a second frame of the sidelink frame structure.

2. The first UE of claim 1, wherein the second timing information further indicates an SFN or a direct frame number (DFN).

3. The first UE of claim 1, wherein the one or more processors, to transmit the SIB to the second UE, are configured to cause the first UE to transmit the SIB to the second UE within a time period of receiving the SIB from the network entity.

4. The first UE of claim 3, wherein the time period is less than a duration of a determined number of frames, or equal to a duration of the determined number of frames.

5. The first UE of claim 1, wherein the one or more processors are further configured to cause the first UE to determine the update based at least in part on a propagation delay between the first UE and the second UE, or a propagation delay between the first UE and the network entity.

6. The first UE of claim 1, wherein the first timing information is global navigation satellite system (GNSS) timing information.

7. The first UE of claim 1, wherein the SIB is a SIB9.

8. The first UE of claim 1, wherein the first slot boundary is a boundary of a last slot, of one or more slots, that includes the SIB.

9. The first UE of claim 1, wherein the one or more processors are further configured to cause the first UE to:

transmit, to the network entity, a request for the SIB.

10. The first UE of claim 9, wherein the one or more processors, to transmit, to the network entity, the request for the SIB, are configured to cause the first UE to:

relay, to the network entity, the request for the SIB.

11. The first UE of claim 1, wherein the one or more processors, to receive, from the network entity, the SIB are configured to cause the first UE to:

receive, from the network entity, the SIB via a Uu interface, wherein the radio link frame structure is associated with the Uu interface.

12. A first user equipment (UE), comprising:

one or more antennas; and one or more processors, coupled to one or more memories, configured to cause the first UE to:

receive, from a second UE, a request for a system information block (SIB) that is associated with a network entity;

receive, from the network entity, the SIB, wherein the SIB includes first timing information that is based at least in part on a first value, associated with first UE, that corresponds to a second value, associated with the network entity, wherein the first timing information indicates a first time corresponding to a first slot boundary of a first frame of a radio link frame structure used for communicating the SIB from the network entity to the first UE, and wherein the first frame is identified by a system frame number (SFN);

transmit, to the second UE, the SIB, wherein frames of the radio link frame structure, used for communicating the SIB from the network entity to the first UE, are not aligned with frames of a sidelink frame structure used for communicating the SIB from the first UE to the second UE; and transmit, to the second UE, second timing information associated with an update to the SIB, wherein the second timing information indicates a timing offset that corresponds to a time difference between the first time and a second time corresponding to a second slot boundary of a second frame of the sidelink frame structure.

13. The first UE of claim 12, wherein the first value is based at least in part on a first clock associated with the first UE, and the second value is based at least in part on a second clock associated with the network entity.

14. The first UE of claim 13, wherein the first clock is synchronized with the second clock.

15. The first UE of claim 12, wherein the one or more processors are further configured to cause the first UE to receive, from the network entity, an indication of the second value.

16. The first UE of claim 15, wherein the one or more processors are further configured to cause the first UE to synchronize the first value with the second value.

17. The first UE of claim 12, wherein the one or more processors are further configured to cause the first UE to generate another SIB based at least in part on receiving the request for the SIB.

18. The first UE of claim 17, wherein the one or more processors are further configured to cause the first UE to determine to transmit the other SIB, via a sidelink communication, without requesting the other SIB from the network entity.

19. The first UE of claim 12, wherein the first timing information is global navigation satellite system (GNSS) timing information.

20. The first UE of claim 12, wherein the SIB is a SIB9.

21. A method of wireless communication performed by a first user equipment (UE), comprising:

receiving, from a network entity, a system information block (SIB) that includes first timing information, wherein the first timing information indicates a first time corresponding to a first slot boundary of a first frame of a radio link frame structure used for communicating the SIB from the network entity to the first UE, and wherein the first frame is identified by a system frame number (SFN);

transmitting, to a second UE, the SIB, wherein frames of the radio link frame structure, used for communicating the SIB from the network entity to the first UE, are not aligned with frames of a sidelink frame structure used for communicating the SIB from the first UE to the second UE; and transmitting, to the second UE, second timing information associated with an update to the SIB, wherein the second timing information indicates a timing offset that corresponds to a time difference between the first time and a second time corresponding to a second slot boundary of a second frame of the sidelink frame structure.

22. The method of claim 21, wherein the second timing information indicates a SFN or a direct frame number.

23. The method of claim 21, wherein the first slot boundary is a boundary of a last slot, of one or more slots, that includes the SIB.

24. The method of claim 21, further comprising:

transmitting, to the network entity, a request for the SIB.

25. The method of claim 21, wherein the SIB is received from the network entity via a Uu interface, wherein the radio link frame structure is associated with the Uu interface.

26. A method of wireless communication performed by a first user equipment (UE), comprising:

receiving, from a second UE, a request for a system information block (SIB) that is associated with a network entity;

receiving, from the network entity, the SIB, wherein the SIB includes first timing information that is based at least in part on a first value, associated with first UE, that corresponds to a second value, associated with the network entity, wherein the first timing information indicates a first time corresponding to a first slot boundary of a first frame of a radio link frame structure used for communicating the SIB from the network entity to the first UE, and wherein the first frame is identified by a system frame number (SFN);

transmitting, to the second UE, the SIB, wherein frames of the radio link frame structure, used for communicating the SIB from the network entity to the first UE, are not aligned with frames of a sidelink frame structure used for communicating the SIB from the first UE to the second UE; and transmitting, to the second UE, second timing information associated with an update to the SIB, wherein the second timing information indicates a timing offset that corresponds to a time difference between the first time and a second time corresponding to a second slot boundary of a second frame of the sidelink frame structure.

27. The method of claim 26, wherein the first value is based at least in part on a first clock associated with the first UE, and the second value is based at least in part on a second clock associated with the network entity.

28. The method of claim 27, wherein the first clock is synchronized with the second clock.

29. The method of claim 26, further comprising receiving, from the network entity, an indication of the second value.

30. The method of claim 29, further comprising synchronizing the first value with the second value.

* * * * *